United States Patent
Rajeevalochana et al.

(10) Patent No.: US 9,198,113 B2
(45) Date of Patent: Nov. 24, 2015

(54) APP FOR PREVENTING PHONE FUNCTIONALITY WHILE DRIVING

(71) Applicants: Aswin Rajeevalochana, Princeton Junction, NJ (US); Radha Raghunathan, Princeton Junction, NJ (US)

(72) Inventors: Aswin Rajeevalochana, Princeton Junction, NJ (US); Radha Raghunathan, Princeton Junction, NJ (US)

(*) Notice: Subject to any disclaimer, the term of this patent is extended or adjusted under 35 U.S.C. 154(b) by 0 days.

(21) Appl. No.: 14/215,627

(22) Filed: Mar. 17, 2014

(65) Prior Publication Data

US 2014/0274023 A1   Sep. 18, 2014

Related U.S. Application Data

(60) Provisional application No. 61/793,823, filed on Mar. 15, 2013.

(51) Int. Cl.
| | |
|---|---|
| *H04M 3/00* | (2006.01) |
| *H04W 48/04* | (2009.01) |
| *H04W 4/02* | (2009.01) |
| *H04W 8/18* | (2009.01) |

(52) U.S. Cl.
CPC ............. *H04W 48/04* (2013.01); *H04W 4/027* (2013.01); *H04W 8/18* (2013.01)

(58) Field of Classification Search
CPC . H04W 8/245; H04M 1/72519; H04M 1/609; B60Q 1/54
USPC ...................... 455/418, 550.1, 569.2; 340/441
See application file for complete search history.

(56) References Cited

U.S. PATENT DOCUMENTS

| | | | |
|---|---|---|---|
| 6,771,946 B1 | 8/2004 | Oyaski | |
| 8,548,441 B1 * | 10/2013 | Jones et al. | ................. 455/414.1 |
| 2003/0109246 A1 | 6/2003 | Shimizu et al. | |
| 2004/0209594 A1 * | 10/2004 | Naboulsi | ..................... 455/404.1 |
| 2009/0002147 A1 | 1/2009 | Bloebaum et al. | |
| 2010/0297929 A1 | 11/2010 | Harris | |
| 2011/0021234 A1 * | 1/2011 | Tibbitts et al. | ................. 455/517 |
| 2011/0111724 A1 | 5/2011 | Baptiste | |
| 2011/0130132 A1 | 6/2011 | Lipovski | |
| 2011/0136509 A1 | 6/2011 | Osann, Jr. | |
| 2011/0294465 A1 | 12/2011 | Inselberg | |
| 2011/0301780 A1 * | 12/2011 | Miller et al. | ....................... 701/1 |
| 2012/0046071 A1 * | 2/2012 | Brandis et al. | ............. 455/556.1 |
| 2012/0214470 A1 | 8/2012 | Tadayon et al. | |
| 2012/0214472 A1 | 8/2012 | Tadayon et al. | |
| 2012/0220284 A1 | 8/2012 | Tadayon et al. | |
| 2012/0231773 A1 | 9/2012 | Lipovski | |
| 2012/0244840 A1 | 9/2012 | Vander Veen et al. | |
| 2012/0329444 A1 | 12/2012 | Osann, Jr. | |
| 2014/0045477 A1 * | 2/2014 | Ewell et al. | ................... 455/418 |
| 2014/0207950 A1 * | 7/2014 | Badiee et al. | ................. 709/224 |

FOREIGN PATENT DOCUMENTS

| | | | |
|---|---|---|---|
| WO | 2010062754 A1 | 6/2010 | |
| WO | 2011085250 A1 | 7/2011 | |

* cited by examiner

*Primary Examiner* — Danh Le

(74) *Attorney, Agent, or Firm* — Gearhart Law, LLC

(57) ABSTRACT

An app designed to prevent using distracting phone functionality, including texting, on a mobile phone while driving a vehicle is disclosed. The app first detects a speed at which the phone is travelling. If the speed is above a threshold, typically 5 mph the user is given a challenge that require either that both hands, or both eyes, are required on the phone. If the challenge is not met, the user is assumed to be the driver and the distracting phone functionality, including texting, is disabled. If the challenge is met, the user is assumed to be a passenger and the distracting phone functionality, including texting, remains enabled.

19 Claims, 3 Drawing Sheets

APP FOR PREVENTING PHONE FUNCTIONALITY WHILE DRIVING

CLAIM OF PRIORITY

This application claims priority to U.S. provisional application 61/793,823 filed on Mar. 15, 2013, the contents of which are hereby incorporated by reference in their entirety.

FIELD OF THE INVENTION

The invention relates to the lock-out of a radiotelephone telecommunications device, and more particularly to an app to prevent a driver of a vehicle from sending or receiving text messages while the vehicle they are driving is in motion.

BACKGROUND OF THE INVENTION

Texting while driving continues to be a significant cause of traffic accidents, despite campaigns to prevent it. The people most at risk appear to be young adults both because they are most proficient at texting and are among the least proficient drivers.

While preventing or deterring a driver of a vehicle from texting or using other distracting features of a mobile phone, it is also an objective not to prevent passengers from texting or using the other features of the phone.

Description of the related art:
The relevant prior art includes:

US Patent Application 20120244840 issued to R. Vander Veen et al. on Sep. 27, 2012 entitled "Motion-Based Disabling of Messaging on a Wireless Communications Device" that describes a system in which if a wireless communications device is traveling a speed exceeding a first predetermined threshold but less than a second predetermined threshold, the device is presumed traveling in a motor vehicle. In order to inhibit operation of the wireless communication device when traveling, access to certain device functions or applications such as e-mail, text messaging, etc. are limited by requiring the user of the device to respond correctly to a randomly generated visual challenge, such as, for example, a CAPTCHA (in which a user is prompted to recognize the characters in a visually distorted string of text). This visual challenge presents a sufficient obstacle that the user will be less likely to use the wireless communications device for e-mailing or texting while operating a motor vehicle.

US Patent Application 20100297929 issued to S. Harris on Nov. 25, 2010 entitled "Prevention against Texting and other Keyboard Operations While Driving" that describes a method of prevention against some, but not all, users in a vehicle using the keyboard on a device while driving. This can prevent the driver texting while driving, or can prevent the driver entering the destination on a GPS while driving.

US Patent Application 20040209594 issued to M. Naboulsi on Oct. 21, 2004 entitled "Safety control system for vehicle" that describes a safety control system for vehicles that includes a communication device having at least one input accessible from within the vehicle and an output communicated within the vehicle, at least one sensor operable to sense at least one condition related to vehicle operation, and a controller communicated with the sensor and the communication device to selectively suppress at least one of said input and said output in response to a sensed parameter of said at least one condition being outside of a threshold. When an input is suppressed, the driver is prevented from accessing or inputting information into the communication device. When an output is suppressed, communication between the device and the driver of a vehicle is suppressed to, among other things, avoid distracting the driver during certain driving situations or conditions relating to the driver, vehicle and/or environment.

U.S. Pat. No. 6,771,946 issued to Oyaski on Aug. 3, 2004 entitled "Method of preventing cell phone use while vehicle is in motion" that describes a method for preventing a driver of a motor vehicle from using a cellular telephone while the motor vehicle is in motion. The invention comprises a step of determining a position of the gear shift lever in such motor vehicle and generating a first signal when the position of such gear shift lever is moved to and remains in one of drive, overdrive, second, low, and reverse. Another step involves transmitting such signal generated in a previous step to a means disposed in a predetermined location on such motor vehicle for generating a reverse phase signal. Another step involves generating such reverse phase signal when such first signal is received by such means. A next step is transmitting such reverse phase signal for a predetermined radius from such predetermined location. A last step is preventing any cellular telephone transmission within such predetermined radius when such reversed phase frequency signal is being transmitted.

Various implements are known in the art, but fail to address all of the problems solved by the invention described herein. Embodiments of this invention are illustrated in the accompanying drawings and will be described in more detail herein below.

SUMMARY OF THE INVENTION

An inventive mobile phone app, designed to prevent texting or other distracting uses of the mobile phone while driving a vehicle, is disclosed.

In a preferred embodiment, the app may include machine readable instructions that may be stored on a mobile phone memory. These instructions may, for instance, be programed modules that enable the mobile phone to perform a variety of functions aimed at preventing phone functionality while driving.

A first function may be to detect a velocity at which a mobile phone is travelling. Detecting the speed or velocity of a mobile phone is well-known in the art and may, for instance, be accomplished using a number of methods such as, but not limited to, using the mobile phones directional accelerometers, usually used to orient the image on the screen, to provide a form of inertial navigation, or by using the mobile phones GPS locating devices to observe how quickly a change of location occurs, or a combination thereof. Once the speed is determined to be above a certain threshold, the mobile phone may assume the mobile phone is travelling in a vehicle. 5 mph seems to be a reasonable speed to differentiate between walking and being in a vehicle.

The next step is to determine if a user of a mobile phone is a driver of the travelling vehicle, or merely a passenger. This determination may be achieved by presenting the mobile phone user with a physical-interaction challenge-task that may only be responded to successfully if the user is not engaged in another activity.

In a preferred embodiment, the physical-interaction challenge-task may be a two-hands-required-on-phone task. If the user has two hands on the mobile phone, they can't also be driving. A simple two-hands-required-on-mobile-phone task may, for instance, be to depress and hold a button with one hand, while performing another phone activity, such as, but not limited to, texting, with the other hand. This task may only be done using two hands. If a user can accomplish the task, the assumption may be that they are a passenger and the mobile phone texting, or any other, function will not be disabled. However, if the challenge is not met satisfactorily, the user is assumed to also be a driver of the vehicle, and the texting and other distracting functions may be disabled until the speed of the vehicle is below the threshold speed or a further challenge is satisfactorily met. Other functions such as, but not limited to, dialing, playing games, watching video, talking on the phone and receiving calls, or some combination thereof, may also be disabled in various embodiments of the invention.

This challenge may be made more difficult by using the a combination of movement and orientation capabilities of a mobile phone such as, but not limited to, the inertial sensors, the GPS or a combination thereof, to determine the direction the vehicle is travelling in an the orientation the phone screen is being held with respect to that direction. The challenge may require the phone screen to be held in a certain orientation relative to the direction of travel, such as, but not limited to, parallel to, or visible in from a point of view opposite to the direction of travel. Such a task may be relatively simple for a passenger but would be extremely difficult for a driver.

In the challenge of holding a button down, the button may be a virtual button, and may switch locations after a brief time forcing the user to pay attention. The time to switch locations may be quasi-random, or may be a fixed time interval that may be of about 0.5 seconds.

The button to be depressed may be a real or virtual keyboard key, and the key to be held may be presented as an audio instruction.

In a further preferred embodiment of the invention, the two-hands-required-on-mobile phone task may make use of the mobile phones ability to determine its orientation, and may, for instance, include adjusting the orientation of the phone to maneuver a screen-object that may sliding around the screen under virtual gravity, i.e. sliding as if it were a real object under gravity following the slope of the screen. The screen-object may need to controlled so as to achieve a goal such as, but not limited to, being kept within the boundaries of a moving icon, maneuver through a set of gates that may be fixed or moving or some combination thereof.

In a further preferred embodiment of the invention, the two-hands-required-on-mobile phone task may make use of the mobile phones ability to determine its orientation, and may, for instance, include challenging the user to move, or shake, the phone in a pattern that may be indicated graphically on the screen.

In a further preferred embodiment of the invention, the physical-interaction challenge-task may be a both-eyes-on-mobile phone task that may require the user to look at a graphic object or in a particular direction for a predetermined length of time. That predetermined length of time may, for instance, be as long as 5 to 10 second. This may be long enough so that a user cannot perform the task satisfactorily, text and perform a third task such as driving a vehicle.

The mobile phone may for instance incorporate a camera and an image recognition module that may recognize a location of the user's eyes or a direction in which the user's eyes are looking. The user may, therefore be required to perform a task such as, but not limited to, looking directly at the camera, or at an object on the camera screen for a predetermined time.

In yet another preferred embodiment of the present invention, the cellphone may include a voice recognition module. The user may be presented with one or more lines of text and be required to read the text. The mobile phone may then use well-known speech recognition to monitor both if the text is being read correctly and—using well-known voice recognition—if the text is being read by the user. The predetermined threshold for passing the challenge may, therefore, be a degree of accuracy with which the text is read, the degree of certainty that it is the user reading the text, or a combination thereof.

Therefore, the present invention succeeds in conferring the following, and others not mentioned, desirable and useful benefits and objectives.

It is an object of the present invention to provide a simple but effective way of preventing a driver from both driving and using distracting phone functionality such as, but not limited to, texting.

It is another object of the present invention to allow non-driving passengers of a car the ability to text while in motion while at the same time preventing the driver from using distracting phone functionality such as, but not limited to, texting.

DESCRIPTION OF THE PREFERRED EMBODIMENTS

Figure 1:
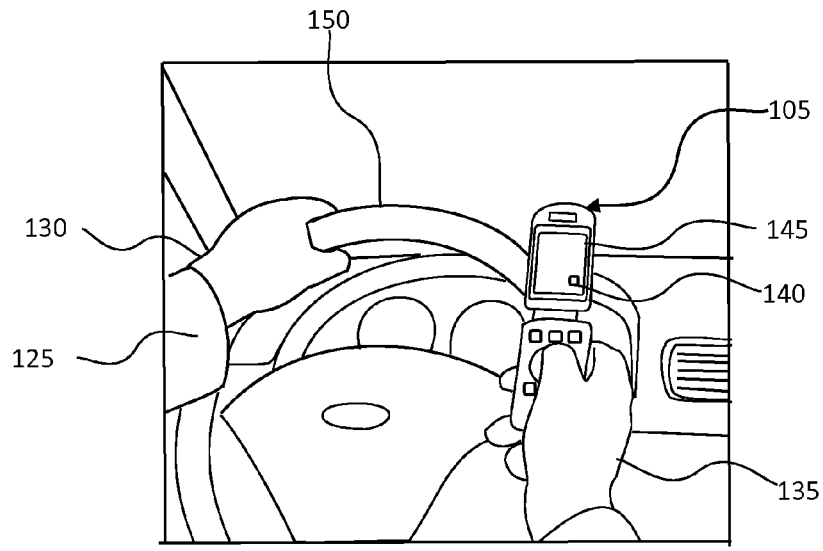
FIG. 1 shows a schematic view of a driver of a car using distracting phone functionality while driving.

The preferred embodiments of the present invention will now be described with reference to the drawings. Identical elements in the various figures are identified with the same reference numerals.

Various embodiments of the present invention are described in detail. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic view of a driver of a car using distracting phone functionality such as, but not limited to, texting while driving.

A driver and user 125 of a mobile phone 105 is shown in FIG. 1 with a left hand 130 on a steering wheel 150 and a right hand 135 holding the mobile phone 105 and using distracting phone functionality such as, but not limited to, texting by depressing keys on the phone's keypad. Shown on the mobile phone display 145 is a virtual button 140.

In a preferred embodiment, when a mobile phone 105 may have detected that it may be in motion and traveling at a speed or a velocity that may exceed a preset threshold, then, unless the virtual button 140 may be held, an app on the cell phone may disable one or more of the mobile phone's functions such as, but not limited to, sending or receiving text messages, making or receiving phone calls, playing games, watching videos or some combination thereof.

In order to depress and hold the button 140 the user may require the use of both hands, i.e., one hand to hold the button and the other to press the keys to send a text. As the driver may be unable to drive the car for any extended period with both hands occupied using the phone, this two-hands-required-on-mobile phone, physical-interaction challenge task may prevent the mobile phone user from both driving and sending text messages, or using other distracting phone functionality.

In a preferred embodiment, the two-hands-required-on-mobile phone, physical-interaction challenge task may be made more difficult by additionally moving the virtual button to a different portion of the screen at short time intervals of between a ¼ second and 2 seconds. In a further preferred embodiment of the invention, the location of the button may be moved to a new position every ½ second. The location of the new position may be selected randomly, or in occur at pre-designated positions in a pseudo-random sequence. Similarly the time interval between changes may be varied pseudo-randomly.

Figure 2:
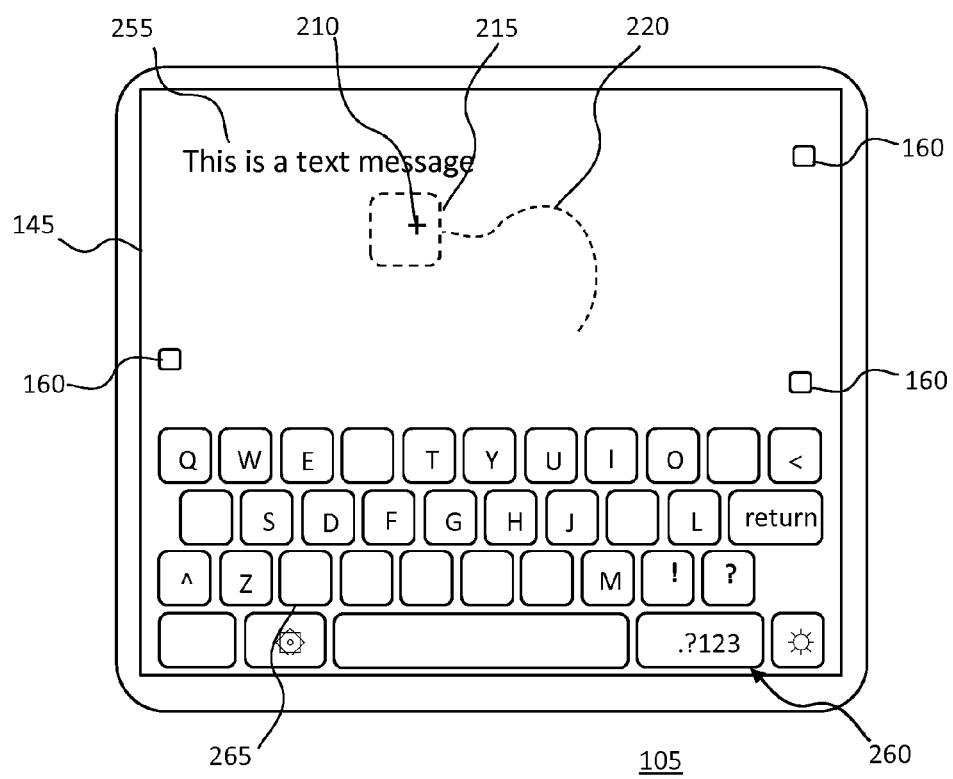
FIG. 2 shows a schematic view of a mobile phone displaying challenges of the present invention designed to prevent using distracting phone functionality while driving.

FIG. 2 shows a schematic view of a mobile phone 105 displaying challenges of the present invention designed to prevent using distracting phone functionality such as, but not limited to, texting while driving.

The mobile phone 105 may, for instance, include an app made up of machine readable instructions that may be stored in the mobile phone's memory. This app or instructions, may enable functions that may prevent the user of the mobile phone from performing distracting tasks such as, but not limited to, sending text messages, presenting the user with a physical-interaction challenge task that may require so much of the user's attention, or the use of both hands, or a combination thereof, so that the user may not be able to both perform the task and drive.

Once the mobile phone 105 has detected that it is travelling at a speed in excess of a threshold speed, such as, but not limited to, 5 mph, the app may issue a challenge. The speed or speed of the mobile phone 105 may, for instance, be determined by one of several well-known methods such as, but not limited to, using GPS location finder, using in-phone accelerometers as an inertial navigation system, or some combination thereof.

One such physical-interaction challenge task may be the two-hands-required-on-mobile phone task described before in which the user may be required to depress and hold a soft button 160. To do this the user may require both hands, one to hold and depress the button, the other to type on the keyboard 260 to produce the text message 255. As both the users hands may be occupied, the user may not be able to drive, perform the task and text at the same time. If the task is not performed adequately, the app may disable the mobile phone's texting capability and any other distracting phone functionality until such time as the task is performed satisfactorily, or the phone may have been travelling at a speed below the threshold speed for a sufficient time, such as, but not limited to, 30 seconds, or a combination thereof.

The button holding task may be made more difficult—and may therefore require more of the user's attention—if the location of the button is moved either continuously or periodically. The soft button 160 may, for instance, drift from one location to another over time. Or the soft button 160 may jump from one location to another. The speed of drifting or the time between jumps may be varied.

In a further preferred embodiment of the invention, the button to be held may be one of the keyboard keys 265. The key to be held may, for instance, be announced as an audio instruction and may also be changed from time to time.

In a further preferred embodiment of the invention, the physical-interaction challenge task may be a two-hands-required-on-mobile phone task that requires adjusting the orientation of the mobile phone 105. Such a task may, for instance, make use of the three-axis MEMs accelerometers available on many mobile phones and which are typically used to determine the orientation of the device in order to display the images or text in the correct direction. Such accelerometers are available on most smart phones, tablets and e-readers, all of which may benefit from the present invention.

A graphic object 210 displayed on the mobile phone display 145 may, for instance, be programmed to move as if it were in a virtual gravity field, i.e., it may be made to slide in a direction of the greatest slope of the display screen and at a speed that may be proportional to the angle of that slope. The graphic object 210 may therefore act similarly to a bubble in a spirit level.

In a preferred embodiment of the present invention, the goal of the challenge may be to keep the graphic object 210 within a defined and moving region 215. As the region traverses a path of movement 220, the user may require one hand to adjust the mobile phone orientation to follow the moving region and the other to text.

The "strength" of the "virtual gravity field" may need to be adjust so that the task may be extremely difficult without both hands, but easy enough for a passenger in a moving car to accomplish while using distracting phone functionality such as, but not limited to, texting. In this way, the app may distinguish between a driver and a passenger.

Figure 3:
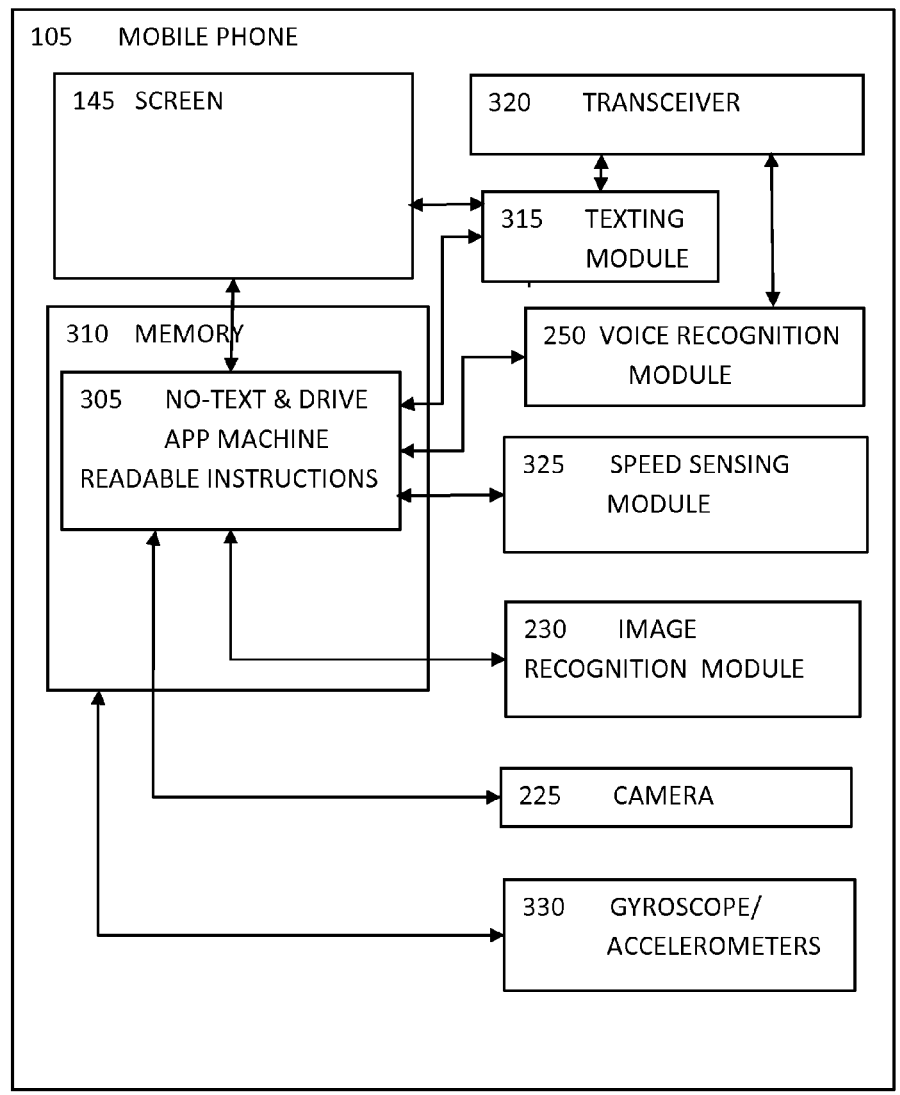
FIG. 3 shows a schematic functional layout of a portion of a mobile phone and functional modules that may be facilitated or used by the app of the present invention.

FIG. 3 shows a schematic functional layout of a portion of a mobile phone 105 and functional modules that may be facilitated or used by the app of the present invention.

The machine readable instructions 305 of the app may, for instance, reside in the mobile phone memory 310.

The machine readable instructions 305 may enable a speed sensing module 325 or may communicate with an existing speed sensing module 325. The speed sensing module 325 may, for instance, rely on well-known methods such as, but not limited to, effectively using, or enabling, a phone gyroscope/accelerometers module 330 as an inertial navigation system, or the GPS location system, or a combination thereof. As humans walk at about 2 mph, any speed above that may be taken as a threshold for preventing using distracting phone functionality such as, but not limited to, texting unless a challenge is met. 5 mph would appear to be a good threshold and is the preferred threshold though any threshold in the range of 3 to 8 mph may be workable.

A further type of physical-interaction challenge-task presented by the app may be a both-eyes-on-mobile-phone-screen task.

In a further preferred embodiment of the invention, the machine readable instructions 305 may access a camera 225 and access or enable an image recognition module 230 on the mobile phone 105. The combination of camera and image recognition may, for instance, be programmed to locate a user's pupils and to use them to determine the direction in which the user is looking.

The both-eyes-on-mobile-phone-screen task may, for instance, be for the user to look at a graphic on the screen for an extended period of time. The length of time may be in a range of 5 to 20 seconds and is preferably at least 10 second may be too long to allow the user to both perform the task and to drive a vehicle. The task may, however, be accomplished with ease by a passenger while using distracting phone functionality such as, but not limited to, texting.

A further both-eyes-on-mobile-phone-screen task may, for instance, be for the user to read one or more lines of text that may be displayed on the mobile phone display 145 by the app. The app may access or enable a voice recognition module 250 that may be trained to recognize the user's voice as well as to recognize words. Monitoring the task may, therefore, include both ensuring that the correct test is read and that it is read by the registered or usual user of the mobile phone.

Control of the texting functionality may be accomplished by the machine readable instructions 305 of the app stored on the transceiver 320 interacting with a texting module 315. The texting module 315 may in turn be interacting with a transceiver 320 in order for the functioning of the mobile phone 105 as a telecommunications device.

Figure 4:
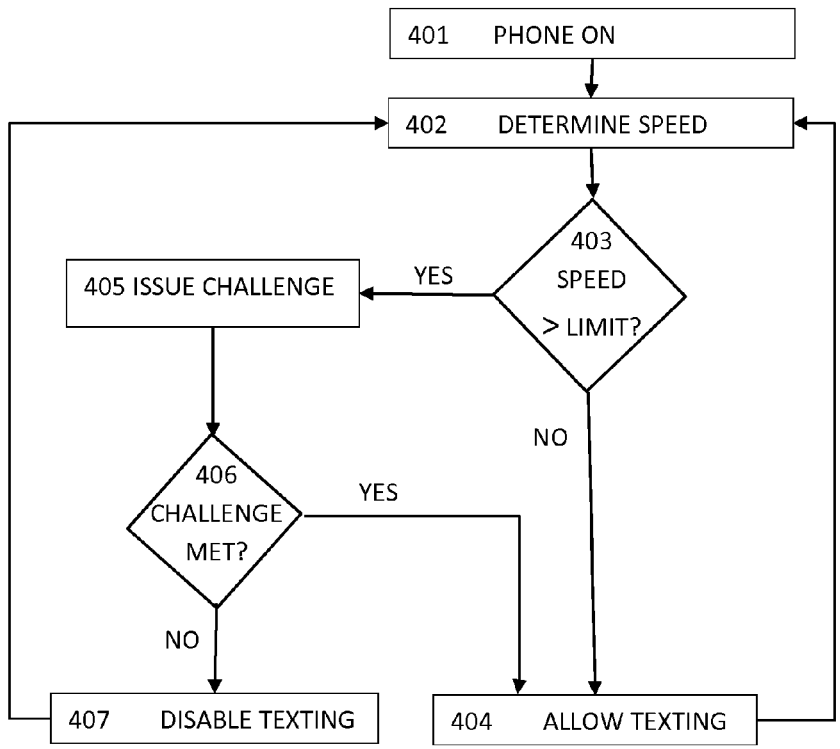
FIG. 4 shows a schematic flow diagram of some of the steps of implementing the app of the present invention.

FIG. 4 shows a schematic flow diagram of some of the steps of implementing the app of the present invention.

In Step 401, a user may turn a cell phone on. This may enable the phone to access voice transceiver towers as well as GPS devices.

In Step 402, the speed at which the phone is travelling may be determined. As detailed above, this may be done using GPS signals, accelerometers in the phone, distances from transmitting towers, or a combination thereof.

In Step 403, having determined the current speed at which the cell phone is traveling, the app may then check to see if that speed exceeds a predetermined limit or threshold. That predetermined limit may, for instance, be determined by the upper limit at which people usually walk. Although champion race walkers can average 9 mph, a brisk walk for a fit young person is 4.0 mph, and most waking is slower. A threshold of 5 mph therefore seems to be reasonable as it is a speed that most people will only achieve when in powered transport of some sort.

The speed of the mobile phone may be determined to be below the threshold speed, in which case the app may proceed to Step 404 and allow the phone to be used for using distracting phone functionality such as, but not limited to, texting.

The speed may, however, be determined to be equal to, or above the threshold, the app may proceed to Step 405 and issue a challenge.

The challenge may, for instance, be a physical-interaction challenge task that involves the phone user to such an extent that they may not be able to perform the task, drive and text at the same time. Examples of such tasks are detailed above and they may fall into two general categories: two-hands-required-on-the-mobile-phone tasks that assume a driver needs at least one hand to be used for steering while driving, and both-eyes-on-mobile-phone-screen tasks that assume that a driver cannot take his eyes off the road for an extended period of time, such as, but not limited to, 10 seconds, and drive safely. By effectively increasing the burden of using distracting phone functionality such as, but not limited to, texting, the app may make using distracting phone functionality such as, but not limited to, texting and driving so dangerous that users may refrain from doing it.

In Step 406 the user's response to the challenge is monitored. If the user has failed to complete the challenge to a required degree of success, the app may proceed to step 407 and disable the texting, or other distracting phone functionality.

The app may then proceed to Step 402 to monitor the current speed.

The challenge may, however, be determined to have been successfully met. In such a case, the app may proceed to Step 404 and allow texting and other distracting phone functionality.

Figure 5:
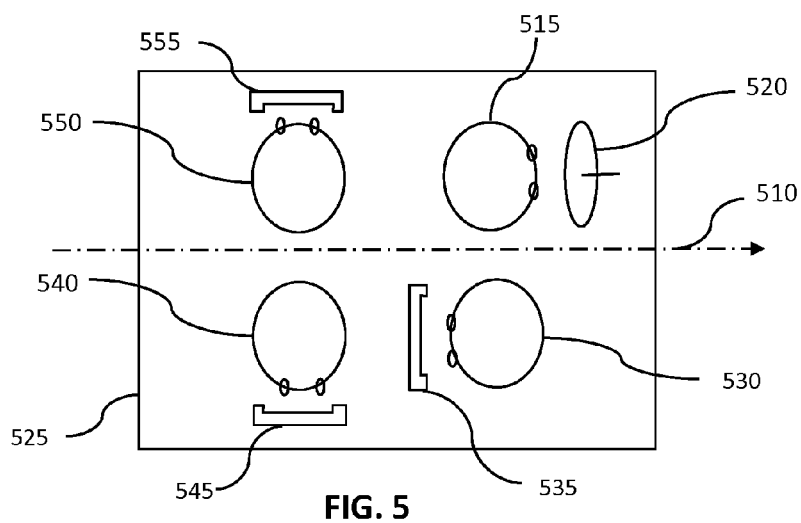
FIG. 5 shows a schematic plan view of a driver and passengers in a vehicle and the orientation of their cell phones relative to the direction of travel.

FIG. 5 shows a schematic plan view of a driver and passengers in a vehicle and the orientation of their cell phones relative to a direction of travel 510 of the vehicle.

The driver 515 is illustrated as being behind a steering wheel 520 looking forward in the direction of travel of the vehicle 525.

A first passenger 530 is shown looking backwards, in the opposite direction to the direction of travel of the vehicle. This enables them to clearly view their cell phone 535 that has its screen oriented such that looking backwards may be the best way to view the screen clearly. Having a cell phone have to be in this orientation in order to show a challenge would make it extremely difficult for a driver to complete the challenge, but would be relatively easy for a passenger to complete.

A second passenger 540 is shown looking at 90 degrees to the right of the direction of travel 510. Their cell phone 545 is oriented so that the plane of the screen is substantially parallel to the direction of travel, and facing in toward the second passenger. Having a cell phone have to be in this orientation in order to show a challenge would make it difficult for a driver to complete the challenge, but would be easy for a passenger to complete.

A third passenger 550 is shown looking at 90 degrees to the left of the direction of travel 510. Their cell phone 555 is oriented so that the plane of the screen is substantially parallel to the direction of travel, and facing in toward the third passenger. Having a cell phone have to be in this orientation in order to show a challenge would make it difficult for a driver to complete the challenge, but would be easy for a passenger to complete.

Although the cellphone screens are shown in three discreet orientations, one of ordinary skill in the art will appreciate that intermediate orientations of the cellphone screens between the ones illustrated may also achieve the goal of making the challenge displayed on the screen easy for a passenger, but difficult if not impossible for the driver.

In yet a further embodiment of the present invention, an app may be designed and implemented to prevent a user using distracting phone functionality while controlling the navigation of the vehicle in the following manner.

The app may access machine readable instructions that may be stored on a mobile phone memory or in the cloud, that enable the mobile phone to perform the following functions.

The phone may detect the orientation and motion of the mobile phone and determine if it is being located adjacent to a direction control element of the vehicle. This may, for instance, indicate if the phone is being located on a steering wheel to steady it while the driver attempts to perform functions on the phone such as, but not limited to, dialing a number, receiving a call, creating a text message, checking an incoming message or some combination thereof.

If the mobile phone motion and orientation are indicative of such a location and motion, the mobile phone may be programed to prevent distracting phone functionality by disabling said mobile phone's distracting phone functionality.

This functionality may, for instance, be enabled by storing various possible orientations and motions of the vehicle's direction control element in a mobile phone memory or in the cloud. The phone may detect the orientation and motion of the mobile phone and determine if they match those of the direction control element of the vehicle. This may, for instance, indicate that the phone is located on a steering wheel in order to steady it while the driver attempts to perform functions on the phone such as, but not limited to, dialing a number, receiving a call, creating a text message, checking an incoming message or some combination thereof.

Although this invention has been described primarily with respect to a cell phone, one of ordinary skill in the art will, however, appreciate that the app, or the methods that constitute the functionality of the app, may be applied to other devices such as, but not limited to, smartphones, tablets, laptop computers, e-readers or some combination thereof.

Although this invention has been described primarily with respect to preventing texting and driving, one of ordinary skill in the art will appreciate that the app and the methods that constitute the functionality of the app may also be applied to other distracting behavior that may occur with a cell phone such as, but not limited to, talking on the cell phone, listening on the cell phone, watching videos on the cell phone, searching for items such as music on the cell phone or some combination thereof.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A non-transitory machine-readable storage medium designed to prevent a user using distracting phone functionality while driving, comprising:
   machine readable instructions, stored on a mobile phone memory or in the cloud, that enable said mobile phone to perform functions comprising:
      detecting a mobile phone speed using a speed sensing module; and
      if said mobile phone speed exceeds a predetermined speed, performing the functions comprising:
         presenting to said user of said mobile phone, a physical-interaction challenge-task;
         monitoring a performance of said physical-interaction challenge task; and
         if said monitored performance falls below a predetermined threshold:
            preventing distracting phone functionality by disabling said mobile phone's distracting phone functionality; and
            continuing to prevent said distracting phone functionality until said current speed of said mobile phone falls below said predetermined speed.

2. The non-transitory machine-readable storage medium of claim 1 wherein said predetermined speed is about 5 mph.

3. The non-transitory machine-readable storage medium of claim 1 wherein said distracting phone functionality comprises both incoming and outgoing texting.

4. The non-transitory machine-readable storage medium of claim 3 wherein said two-hands-required-on-mobile phone task comprises depressing a button on said mobile phone.

5. The non-transitory machine-readable storage medium of claim 4 wherein said button on said mobile phone is a soft button.

6. The non-transitory machine-readable storage medium of claim 5 wherein said button to be held appears at a new location within a predetermined time.

7. The non-transitory machine-readable storage medium of claim 6 wherein said predetermined time is about 0.5 seconds.

8. The non-transitory machine-readable storage medium of claim 6 wherein said predetermined time varies pseudo-randomly.

9. The non-transitory machine-readable storage medium of claim 1 wherein said physical-interaction challenge-task is a two-hands required-on-mobile phone task and said distracting phone functionality comprises texting.

10. The non-transitory machine-readable storage medium of claim 9 wherein said button to be depressed is indicated via an audio command.

11. The non-transitory machine-readable storage medium of claim 9 wherein said button to be depressed is indicated via a visual indicator.

12. The non-transitory machine-readable storage medium of claim 3 wherein said two-hands-required-on-mobile phone task comprises adjusting a spatial orientation of said mobile phone in order to maintain a graphic object in a defined and moving region on the mobile phone display.

13. The non-transitory machine-readable storage medium of claim 1 wherein said physical-interaction challenge-task is a both-eyes-on mobile phone task and said distracting phone functionality comprises texting.

14. The non-transitory machine-readable storage medium of claim 13 wherein said both-eyes-on-mobile phone task requires looking at a graphic object on said mobile phone screen.

15. The non-transitory machine-readable storage medium of claim 14 wherein said mobile phone incorporates a camera and said machine readable instructions further enable an image recognition module and a function that recognizes a location of said user's eyes and a direction said user's eyes are looking towards and said predetermined threshold comprises a length of contiguous time said users eyes are determined to be looking at said mobile phone screen.

16. The non-transitory machine-readable storage medium of claim 15 wherein said length of contiguous time that satisfies said predetermined threshold is about 5 seconds.

17. The non-transitory machine-readable storage medium of claim 15 wherein said machine readable instructions further enable a voice recognition module and wherein said both-eyes-on-mobile phone task comprises displaying text on said mobile phone screen and wherein said predetermined threshold comprises said voice recognition module identifying said user as a reader of said text.

18. The non-transitory machine-readable storage medium of claim 17 wherein said displayed text is changing with time and wherein said predetermined threshold comprises continuously recognizes said identification of said changing text as being read by said user.

19. The non-transitory machine-readable storage medium of claim 1 further comprising machine readable instructions that enable said mobile phone to perform functions comprising:
   detecting a the orientation of a mobile phone screen relative to a direction of travel of the vehicle; and
   disabling one or more functions of said mobile phone unless said mobile screen is oriented substantially parallel to said direction of travel.

* * * * *